June 24, 1947.   P. C. SMITH   2,422,807

ART OF ASCERTAINING THE ATOMIC STRUCTURE OF MATERIALS

Filed March 29, 1945

INVENTOR.
PERRY C. SMITH
BY
ATTORNEY

Patented June 24, 1947

2,422,807

UNITED STATES PATENT OFFICE 2,422,807

ART OF ASCERTAINING THE ATOMIC STRUCTURE OF MATERIALS

Perry C. Smith, Moorestown, N. J., assignor to Radio Corporation of America, a corporation of Delaware Application March 29, 1945, Serial No. 585,561

3 Claims. (Cl. 250—49.5)

This invention relates to the art of ascertaining the atomic structure of materials and has special reference to the provision of improvements in methods of and means for producing electron diffraction patterns of opaque and transparent specimen materials.

Figure 1:
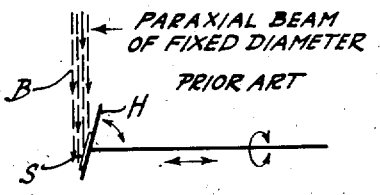
Figure 2:
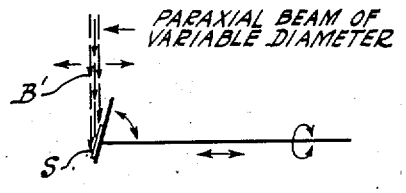
Figure 3:
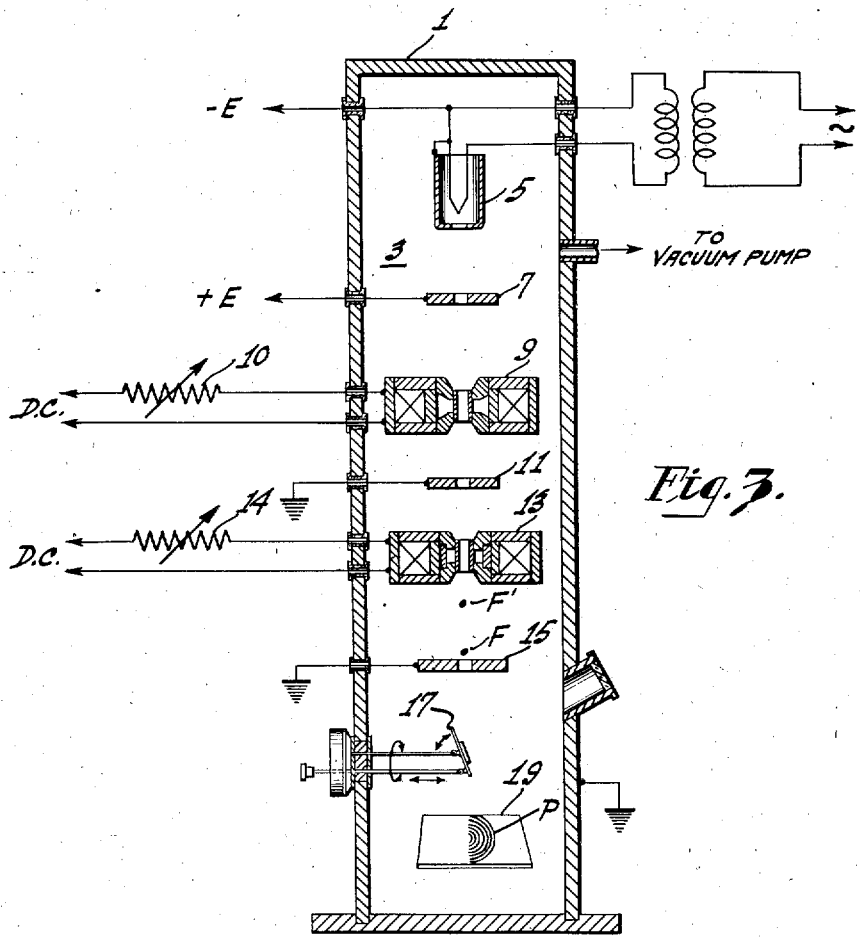

The invention will be described in connection with the accompanying drawing, wherein:

Fig. 1 is a diagrammatic elevational view of the specimen stage of a conventional electron diffraction camera, which will be referred to in explaining the problem with which the present invention is primarily concerned, Fig. 2 is a view similar to Fig. 1 but modified to indicate the manner in which said problem is solved by the present invention, and Fig. 3 is a diagrammatic sectional view of an electron lens system which may be employed in carrying the invention into effect.

It is well known to those skilled in the art of electron-microscopy and diffraction that if an electron-optical instrument is to be employed as an electron-diffraction camera the electron beam which impinges the specimen S (Figs. 1 and 2) must comprise a bundle of substantially paraxial rays B. In order to orient properly the specimen with respect to the paraxial electron rays or beam B it is necessary or expedient to provide a specimen holder H which is capable of being moved in any and all directions with respect to the beam. Such a "universal movement" is indicated by the double-ended straight and curved arrows in Fig. 1; a suitable mechanism for this purpose is described in Frank E. Runge application Ser. No. 500,620 filed August 31, 1943. The specimen holder may thus be manipulated in such a way as to expose either a large number or a very small number of elementary areas of the specimen to the beam. If the specimen is a homogenous one and a relatively large area is exposed to the beam, the diffraction pattern obtained will comprise a continuous ring, while in the second case a punctiform pattern will be obtained. If, on the other hand, the specimen is a non-homogenous one, e. g., one containing an impurity, such as a speck of foreign matter, it is usually impossible to bring the beam to bear solely on the foreign particle so that its atomic structure may be analyzed. That this is so will be apparent when it is recalled that the beam-forming aperture is usually much larger than a single elementary area of the specimen and that in present-day diffraction cameras it is impossible to alter the diameter of the (paraxial) beam without substituting one apertured beam-forming element for another of different aperture size.

Accordingly, the principal object of the present invention is to provide a novel method o and means for exploring a specimen with an electron probe constituted of paraxial rays whereb to obtain a diffraction pattern which shall em brace any desired area of the specimen, and t obtain the pattern without mechanically alterin the diameter of the beam-forming aperture or it position with respect to other elements of th beam-forming mechanism.

The foregoing and other objects are achieve in accordance with the invention by the provi sion of an electron-lens system (later described capable of providing a paraxial beam or prob of substantially any desired useful diamete Thus, it will be apparent (referring now to Fig. 2 that by the use of a probe of variable diamete a diffraction pattern of either the entire speci men or any part thereof may be explored by al tering the diameter of the said beam (as indi cated at B') and manipulating the specimen hold er to bring the selected area of the specimen int register with the altered beam at the angle re quired to produce a diffraction pattern charac teristic of said area. An electron-lens syster capable of providing a paraxial beam of variabl diameter is shown in Fig. 3.

In Fig. 3 there is shown an electron diffrac tion camera, indicated generally at 1, compris ing an evacuable chamber 3 containing a cathod 5, an anode 7, a first magnetic lens 9, a beam forming aperture 11, a second magnetic lens 1 a second fixed apertured plate 15, an adjustabl specimen holder 17 and a screen or cassette 1 all arranged in spaced concentric array in th order named along the central axis of the cham ber 3. It will be observed that the magneti lenses 9 and 13 are adjustable as indicated by th rheostats 10 and 14, respectively. The first ler 9 serves to concentrate the electrons from th cathode 1 upon the first beam-forming apertur 11 and, to this end, is normally adjusted to pro vide the maximum possible concentration of elec trons adjacent to the said aperture. The secon lens 13, on the other hand, is provided for alter ing (i. e., "raising" and "lowering") the electron crossing point or focus F of the rays which ar directed to the aperture 15. It is this chang in the position of the focal point of the ra} which alters the diameter of the beam adjacer to the specimen holder or target 17. Thus, if th focal point of the beam is close to the fixed aper tured disc 15, as indicated at F, more of the ra} will impinge the specimen than would be the case if the focus of the said rays were at a point F', which is further removed from the said aperture. In either event it is the substantially paraxial rays through the aperture 15 and striking the specimen which gives rise to the diffraction pattern P on the screen or cassette 19.

The preferred practice in operating the electron diffraction camera of Fig. 3 is to start with a beam of a diameter sufficient to irradiate the entire specimen, or the major portion thereof, with the electron rays. This will ordinarily produce a circular (or semi-circular) pattern upon the viewing device 19. Assuming that the specimen is properly centered, an increase in intensity of the magnetic field in the region of the lens 13 will raise the focal point F of the rays and decrease the diameter of the beam so that it spans a smaller area of the specimen. Thus, if the specimen comprises a multiplicity of elementary crystalline particles the diffraction pattern obtained in the first instance will be characteristic of all or many of the particles (and will thus comprise a pattern of rings), while in the second case (i. e., with a narrow beam) a dot-like pattern characteristic of a single crystal may be achieved. If the diffraction pattern indicates that the specimen contains foreign matter the specimen holder can be manipulated to bring it into register at the proper angle with the narrow beam, so that a diffraction pattern of the foreign matter per se is obtained.

What is claimed is:

1. An electron diffraction instrument comprising, an electron-emissive cathode, means for holding an object in the path of said electrons at the angle required to produce a diffraction pattern of said object, a beam-forming apertured electrode mounted intermediate said cathode and said object holder, and means mounted adjacent to the cathode side of said apertured electrode for altering the angle at which said electrons pass through said apertured electrode and hence the diameter of said beam adjacent to said object holder.

2. An electron diffraction camera comprising an electron-emissive cathode, a pair of spaced apart apertured beam-forming electrodes and a specimen holder mounted in spaced relation and in the order named along a common axis, means for so directing said electrons that their paths will cross at a point in the space between said pair of apertured electrodes, and means for moving said electron crossing-point along said axis within said space whereby to alter the diameter of said beam adjacent to said specimen holder.

3. The invention as set forth in claim 2 and wherein said last mentioned means comprises an adjustable magnetic electron-lens mounted in the space between said spaced apart beam-forming electrodes.

PERRY C. SMITH.

REFERENCES CITED

The following references are of record in the file of this patent:

UNITED STATES PATENTS

| Number | Name | Date |
| --- | --- | --- |
| 2,372,422 | Hillier | Mar. 27, 1945 |
| 2,233,264 | Marton | Feb. 25, 1941 |
| 2,281,325 | Ramo | Apr. 28, 1942 |

OTHER REFERENCES

"Journal of Scientific Instruments," vol. 14 (1937).

"New Electron Microscope," Martin, Whelpton and Parnum, pages 14–24. (Copy in Div. 54, 250—49.5.)

"Electron Optics," Meyer's; pages 444–446; D. Van Nostrand Co., Inc. (1939). (Copy in Div. 54.)